US011789750B2

(12) United States Patent
Mu

(10) Patent No.: US 11,789,750 B2
(45) Date of Patent: Oct. 17, 2023

(54) DATA PROCESSING METHOD, APPARATUS, AND MEDIUM

(71) Applicant: Beijing Xiaomi Mobile Software Co., Ltd., Beijing (CN)

(72) Inventor: Weihu Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 272 days.

(21) Appl. No.: 17/171,248

(22) Filed: Feb. 9, 2021

(65) Prior Publication Data

US 2021/0406036 A1    Dec. 30, 2021

(30) Foreign Application Priority Data

Jun. 24, 2020  (CN) .......................... 202010584314.6

(51) Int. Cl.
  *G06F 9/445*  (2018.01)
  *G06F 8/71*   (2018.01)
  *G06F 9/451*  (2018.01)
  *G06F 9/4401* (2018.01)

(52) U.S. Cl.
  CPC ............ *G06F 9/44505* (2013.01); *G06F 8/71* (2013.01); *G06F 9/44521* (2013.01); *G06F 9/4411* (2013.01); *G06F 9/451* (2018.02)

(58) Field of Classification Search
  CPC ...... G06F 8/71; G06F 9/4411; G06F 9/44505; G06F 9/44521; G06F 9/451
  See application file for complete search history.

(56) References Cited

U.S. PATENT DOCUMENTS

| 2004/0015877 | A1* | 1/2004 | Arrouye .............. G06F 9/44521 |
| | | | 717/127 |
| 2006/0200817 | A1 | 9/2006 | Callender |
| 2012/0246614 | A1 | 9/2012 | Sliwowicz |
| 2017/0123767 | A1 | 5/2017 | Wang et al. |
| 2017/0372111 | A1* | 12/2017 | Ji ............................ G06F 21/32 |
| 2018/0299975 | A1* | 10/2018 | Park .................... G06F 3/04883 |
| 2020/0363898 | A1* | 11/2020 | He .......................... G06F 3/045 |

FOREIGN PATENT DOCUMENTS

WO    WO 2019/105188 A1    6/2019

OTHER PUBLICATIONS

Extended European Search Repon dated Jul. 26, 2021 in European Patent Application No. 21158754.8.

* cited by examiner

*Primary Examiner* — Terrell S Johnson
(74) *Attorney, Agent, or Firm* — Oblon, McClelland, Maier & Neustadt, L.L.P.

(57) ABSTRACT

Aspects of the present disclosure can provide a data processing method, apparatus, and medium. The data processing method is applied to a terminal and can include obtaining a data-to-be-processed through an integrated circuit on the terminal, sending the data-to-be-processed to an application processor of the terminal, and processing, by the application processor, the data-to-be-processed and generating a result data.

17 Claims, 3 Drawing Sheets

DATA PROCESSING METHOD, APPARATUS, AND MEDIUM

CROSS-REFERENCE TO RELATED APPLICATIONS

This application is based upon and claims priority to Chinese Patent Application No. CN 202010584314.6, filed on Jun. 24, 2020, the entire content of which is incorporated herein by reference.

TECHNICAL FIELD

The present disclosure relates to the field of smart terminals, including to a data processing method, apparatus, and medium.

BACKGROUND

At present, most peripheral devices of terminals, such as mobile phones, use integrated circuits (ICs) from third-party manufacturers. Take a touch screen as an example, the whole machine manufacturer basically purchases devices from suppliers to use. With the increasing number of end users and the higher and higher performance requirements for end users on the terminal, the storage space required for IC devices is increasing. Therefore, the cost of the IC devices has been continuously increasing.

The firmware integrated in the IC by a manufacturer mainly includes hardware-related algorithms and software-related algorithms. The firmware integrated in the IC takes up a large amount of storage space of the IC, thereby affecting operation of the IC. Continuously expanding the storage space of the IC, in turn increases the cost of the device.

SUMMARY

According to a first aspect of the present disclosure, there is provided a data processing method, applied to a terminal. The method can include obtaining a data-to-be-processed through an integrated circuit on the terminal, sending the data-to-be-processed to an application processor of the terminal, and processing, by the application processor, the data-to-be-processed and generating a result data.

According to a second aspect of the present disclosure, there is provided a data processing apparatus that is applied to a terminal. The apparatus can include an integrated circuit configured to obtain a data-to-be-processed, and an application processor configured to receive the data-to-be-processed, process the data-to-be-processed, and generate a result data.

According to a third aspect of the present disclosure, there is provided a data processing device that is applied to a terminal. The data processing device includes a processor, and a memory configured to store instructions executable by the processor. The processor can be configured to obtain a data-to-be-processed through an integrated circuit on the terminal, send the data-to-be-processed to an application processor of the terminal, and process, by the application processor, the data-to-be-processed and generate a result data.

According to a fourth aspect of the present disclosure, there is provided a non-transitory computer-readable storage medium, wherein instructions in the storage medium, when being executed by a processor of a router, cause a data processing method to be executed. The method is applied to a terminal and the method can include obtaining a data-to-be-processed through an integrated circuit on the terminal, sending the data-to-be-processed to an application processor of the terminal, and processing, by the application processor, the data-to-be-processed and generating a result data.

It should be understood that the above general description and the following detailed description are merely exemplary and explanatory, and should not limit the present disclosure.

BRIEF DESCRIPTION OF THE DRAWINGS

The drawings herein are incorporated into the specification and constitute a part of the specification, show embodiments in accordance with the present disclosure and together with the specification are used to explain the principle of the present invention.

DETAILED DESCRIPTION

The exemplary embodiments will be described in detail here, and examples thereof are shown in the accompanying drawings. When the following description refers to the accompanying drawings, unless otherwise indicated, the same numbers in different drawings represent the same or similar elements. The implementation manners described in the following exemplary embodiments do not represent all implementation manners consistent with the present invention. Rather, they are merely examples of apparatus and methods consistent with some aspects of the present disclosure as detailed in the appended claims.

A firmware integrated in an integrated circuit (IC) by a manufacturer mainly includes hardware-related algorithms, such as hardware circuit-related algorithms, and software-related algorithms, such as algorithms related to noise removal processing (i.e., de-noising processing), calculation of a touch-to-screen position (which means a position where a finger is touched on the screen), and user's application scenes. These firmware integrated in the IC occupy a large amount of storage space of the IC, thereby affecting the operation of the IC. In order to solve this problem, it is necessary to continuously expand the storage space of the IC, which in turn increases the cost of the device.

The present disclosure provides a data processing method. In the method, a data-to-be-processed is obtained through an integrated circuit on a terminal. The data-to-be-processed is then sent to an application processor of the terminal. The data-to-be-processed is processed by the application processor processes and a result data is generated. The result data is then obtained by an operating system of the terminal. In the present disclosure, the software-related algorithms (firmware) in the IC are set in the application processor of the terminal, and only the hardware-related algorithms are reserved in the IC. In this way, there is no need to store too much firmware in the IC, which saves the storage space of the IC, thereby reducing costs of devices and improving user experience of products.

Figure 1:
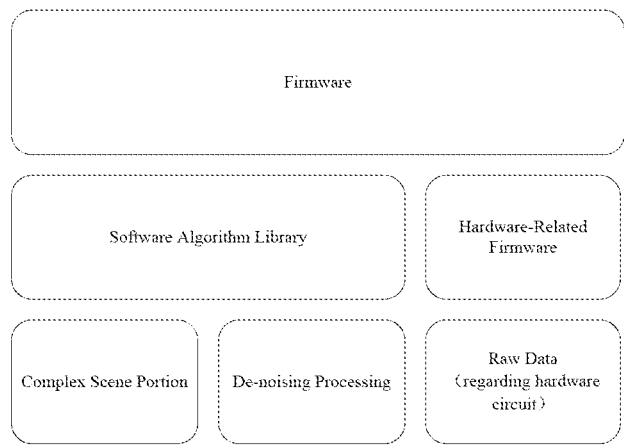
FIG. 1 is a schematic diagram showing a firmware separation frame according to an exemplary embodiment.

FIG. 1 shows a firmware separation framework in a data processing method of the present disclosure. A whole of firmware is divided into a software algorithm part and a hardware algorithm part, namely a software algorithm library and a hardware-related firmware. The hardware-related firmware is executed at IC side, and the software algorithm library is executed in an application processor of the terminal. The software algorithm library is responsible for data processing and de-noising processing related to complex scenes, and the hardware-related firmware is responsible for processing related to raw data, that is, data processing related to hardware circuits.

Figure 2:
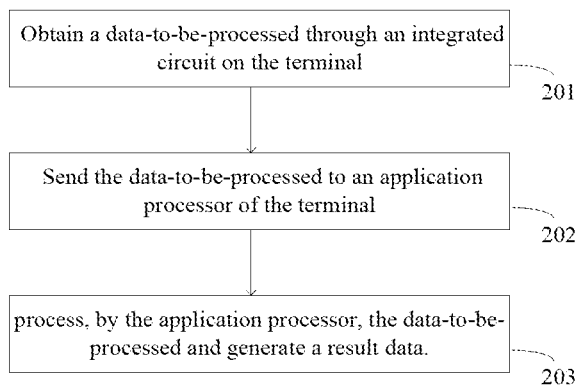
FIG. 2 is a flow chart showing a data processing method according to an exemplary embodiment.

The present disclosure provides a data processing method, which is used for a terminal. The terminal herein can be a smart terminal used by users, including a mobile phone, a tablet computer, a wearable device, and the like. FIG. 2 is a flow chart showing a data processing method according to an exemplary embodiment. The data processing method includes the following steps.

At a step 201, a data-to-be-processed is obtained through an integrated circuit on the terminal.

At a step 202, the data-to-be-processed is sent to an application processor of the terminal.

At a step 203, the data-to-be-processed is processed by the application processor, and a result data is generated.

In the step 201, the data-to-be-processed is obtained through the integrated circuit on the terminal. Herein, the data-to-be-processed refers to data related to the user's application scenes, that is, the collected data about application situation of the user. For example, when the user inputs through a touch screen, the data-to-be-processed is the collected data related to the touch-to-screen position. Furthermore, the data-to-be-processed herein is data that needs to be processed by the software-related firmware.

In steps 202 and 203, the collected data-to-be-processed is sent to the application processor of the terminal, so that the collected data-to-be-processed is processed by the application processor via a relevant firmware, so as to generate the result data.

Finally, the result data is obtained by the operating system of the terminal, so as to perform related system operations. For example, when the operating system is an Android system, the result data is sent to an upper layer of the Android system, that is, an application layer of the Android system.

Using the above method, the data-to-be-processed is processed by a firmware included in the application processor, which saves the storage space in the integrated circuit and reduces the operating burden in the integrated circuit, thereby reducing requirements for the storage space and processing capability of the integrated circuit and reducing costs of devices.

In an optional embodiment, the method further includes setting a hardware-related firmware in the integrated circuit, and setting a software algorithm library in the application processor.

The hardware-related algorithm (firmware) is set in the integrated circuit, and the data-to-be-processed is collected through the hardware-related firmware. The software-related algorithm (firmware), that is, the software algorithm library, is set in the application processor (AP) of the terminal. The operating system, the user interface, and application programs usually all run in the application processor. In the present disclosure, the software algorithm library is set in the application processor, and the data related to the user's application scenes is processed by the application processor via the software algorithm library. The hardware-related firmware is used to process, for example, raw data obtained by the hardware circuit, and the software algorithm library is used to perform, for example, de-noising processing, setting of user application scenarios, etc.

Using this method, on the one hand, the storage space of the IC is saved, because the software algorithm library is no longer stored in the IC. On the other hand, the operating burden of the IC is reduced, because there is no need to perform related data processing in the IC.

In an optional implementation, the step 202 of sending the data-to-be-processed to an application processor of the terminal includes sending the to-be-processed data to a driving module on the terminal, and sending, by the driving module, the to-be-processed data to the application processor. Of course, it should be understood that one or more of the modules described in this disclosure can be implemented, for example, by circuitry.

The driving module herein is, for example, a touch-to-screen driving program module. In this embodiment, after the data-to-be-processed is collected by the IC via the hardware-related firmware, the data-to-be-processed is reported to the touch-to-screen driving program module, and then the data-to-be-processed is reported by the touch-to-screen driving program module to the application processor.

In an optional implementation, the step of obtaining, by the operating system of the terminal, the result data includes sending, by the application processor, the result data to the driving module on the terminal, and sending, by the driving module, the result data to an application layer of the operating system.

The data-to-be-processed is processed by the application processor via the software algorithm library set therein (i.e. the software algorithm library included in the application processor), and obtains the result data. In some operating systems (such as the Android operating system), due to reasons of the operating system, the application processor cannot directly report the result data to the application layer of the operating system. Therefore, the application processor needs to send the result data to the driving module (such as a touch-to-screen driving program module), and the driving module reports the result data to the application layer of the operating system. The application layer of the operating system herein is, for example, an upper layer of the Android operating system.

In an optional implementation, the step 201 of obtaining the data-to-be-processed through the integrated circuit on the terminal includes obtaining the data-to-be-processed through the hardware-related firmware in the integrated circuit. The integrated circuit is provided with the hardware-related firmware. By using this hardware-related firmware, the data-to-be-processed can be obtained. For example, a touch-to-screen position data of the user is obtained through the hardware-related firmware.

In an optional implementation, the step 203 of processing, by the application processor, the data-to-be-processed and generating the result data includes processing, by the application processor via a software-related firmware, the data-to-be-processed, and generating the result data.

The application processor in the terminal usually runs multimedia function applications, which can be used for functions such as taking photos and videos, playing audio and video, game interacting, and so on. These functions are, for example, Digital camera, MP3 player, FM radio reception, video image playing and other functions. In the present method, the software algorithm library originally set in the terminal IC is moved to the application processor, that is, the data-to-be-processed collected by the IC is processed in the application processor, instead of processing the data-to-be-processed in the IC. This not only saves the storage space required for storing the software algorithm library in the IC, but also reduces the processing burden of the IC running the firmware.

In an optional embodiment, the method further includes: sending, by the operating system, configuration information of a function switch to the application processor; and controlling, by the application processor via the software-related firmware, the integrated circuit to perform an operation related to the configuration information of the function switch.

Figure 3:
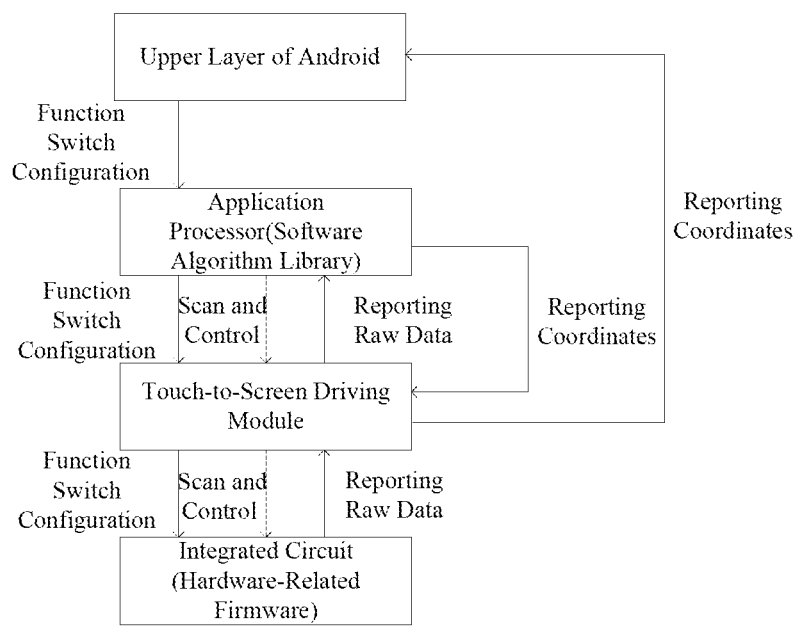
FIG. 3 is a schematic diagram showing a data processing process according to an exemplary embodiment.

As shown in FIG. 3, in this embodiment, the application layer of the operating system (for example, the upper layer of the Android system) sends configuration information of the function switch to the application processor, wherein the function switch is, for example, opening an interface to display. Based on the received configuration information of the function switch, the application processor, from the dynamic algorithm library (software algorithm library) set therein (i.e., the dynamic algorithm library included in the application processor), selects a corresponding algorithm, and then through the driving module (i.e., the touch-to-screen driving program module), the application processor controls the IC to perform related operations. Herein, a response operation of the IC is controlled by selecting a firmware corresponding to the configuration information of the function switch from the application processor. This response process is different from a process in which the application layer of the operating system directly transmits the configuration information of the function switch to the IC so as to make a response by the IC.

Figure 4:
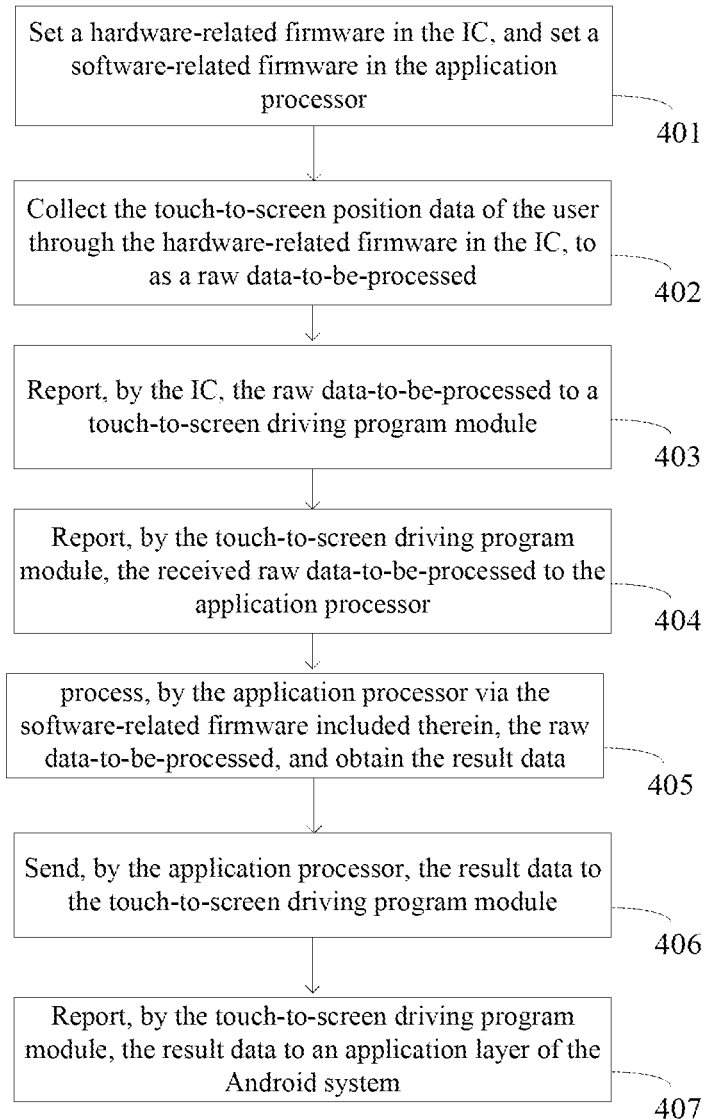
FIG. 4 is a flowchart showing a data processing method according to an exemplary embodiment.

The present disclosure also provides a specific embodiment according to the above method. In this embodiment, the terminal is a mobile phone, and the operating system of the mobile phone is the Android operating system. The mobile phone includes an integrated circuit (IC) and an application processor, and the data-to-be-processed collected by the IC is a touch-to-screen position data of the user. Referring to FIG. 3, the processing process of the method in this embodiment is described, wherein the expression of 'Scan and Control' means that the software algorithm in the application processor, through the touch-to-screen driving module, controls the IC to work. For example, as shown in FIG. 4, this embodiment includes the following steps.

At a step 401, a hardware-related firmware is set in the IC, and a software algorithm library is set in the application processor.

At a step 402, the touch-to-screen position data of the user is collected through the hardware-related firmware in the IC, to as a raw data-to-be-processed.

At a step 403, the raw data-to-be-processed is reported by the IC to a touch-to-screen driving program module.

At a step 404, the received raw data-to-be-processed is reported by the touch-to-screen driving program module to the application processor.

At a step 405, the raw data-to-be-processed is processed by the application processor via the software algorithm library included therein, and the result data (that is, the reported coordinates) is obtained.

At a step 406, the result data is sent by the application processor to the touch-to-screen driving program module.

At a step 407, the result data is reported by the touch-to-screen driving program module to an application layer of the Android system.

Figure 5:
FIG. 5 is a block diagram showing a data processing apparatus according to an exemplary embodiment.

The present disclosure also provides a data processing apparatus. As shown in FIG. 5, the data processing apparatus includes an integrated circuit 501 and an application processor 502. The integrated circuit 501 is configured to obtain a data-to-be-processed. The application processor 502 is configured to receive the data-to-be-processed, process the data-to-be-processed, and generate a result data.

In an optional implementation, the hardware-related firmware is set in the integrated circuit, and the software algorithm library is set in the application processor.

In an optional implementation, the data processing apparatus further includes a driving module. The driving module is configured to receive the to-be-processed data sent by the integrated circuit and send the to-be-processed data to the application processor.

In an optional implementation, the application processor 502 is further configured to send the result data to the driving module in the data processing apparatus.

The driving module is further configured to send the result data to an application layer of the operating system.

In an optional implementation, the integrated circuit 501 is further configured to via the hardware-related firmware in the integrated circuit, obtain the data-to-be-processed.

In another implementation, the application processor 502 is further configured to process, by the application processor via the software related firmware, the data-to-be-processed and generate the result data. In further implementations, the application processor 502 is further configured to receive configuration information of a function switch sent by the operating system; and control, by the software-related firmware, the integrated circuit to perform an operation related to the configuration information of the function switch.

Regarding to the data processing apparatus in the foregoing embodiment, the specific manner in which each module performs operation has been described in detail in the embodiment of the method, and detailed description will not be given here.

In the present disclosure, the software-related algorithms (i.e., firmware) in the IC are set in the application processor of the terminal, and only the hardware-related algorithms are reserved in the IC. In this way, there is no need to store too much firmware in the IC, which saves the storage space of the IC, thereby reducing the cost of the device.

Using the above method, the data-to-be-processed is processed by the firmware set in the application processor, which saves the storage space in the integrated circuit and reduces the operating burden in the integrated circuit, thereby reducing the requirements for storage space and processing capability of the integrated circuit and reducing costs of the devices.

The present disclosure provides a data processing method. In the method, the data-to-be-processed is obtained through an integrated circuit on the terminal. The data-to-be-processed is then sent to an application processor of the terminal. The data-to-be-processed is processed by the application processor and the result data is generated. The result data can then be obtained by the operating system of the terminal.

In the present disclosure, the software-related algorithms (firmware) in the IC are set in the application processor of the terminal, and only the hardware-related algorithms are reserved in the IC. In this way, there is no need to store too much firmware in the IC, thereby saving the storage space of the IC, and reducing the cost of the device. Due to the reduction of unnecessary requirements for the IC space, the cost of the entire machine at terminal is reduced. Moreover, this method is conducive to meeting the increasingly complex needs of users, improving product quality, and promoting third-party manufacturers to study more complex algorithms. In addition, this method turns a traditional black box development into a gray box development or even a complete white box development.

Using the above method, the data-to-be-processed is processed by the firmware set in the application processor, which saves the storage space in the integrated circuit and reduces the operating burden in the integrated circuit, thereby reducing requirements for the storage space and processing capability of the integrated circuit and reducing costs of the integrated device.

Figure 6:
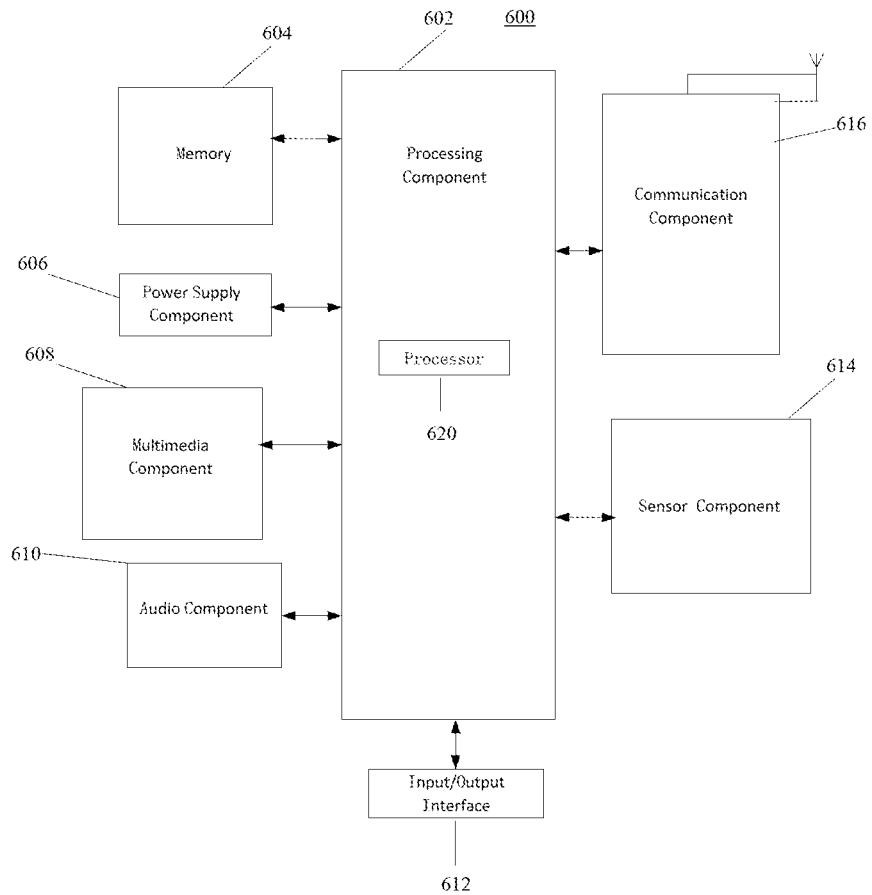
FIG. 6 is a block diagram showing an apparatus according to an exemplary embodiment.

FIG. 6 is a block diagram of apparatus 400 for detecting an image occluded by a finger according to an exemplary embodiment. Referring to FIG. 6, the apparatus 600 may include one or more of the following components: a processing component 602, a memory 604, a power supply component 606, a multimedia component 608, an audio component 610, an input/output (I/O) interface 612, a sensor component 614, and a communication component 616.

The processing component 602 generally controls the overall operation of the apparatus 600, such as operations associated with display, telephone calls, data communications, camera operations, and recording operations. The processing component 602 may include one or more processors 620 to execute instructions, so as to complete all or part of the steps of the method described above. In addition, the processing component 602 may include one or more modules to facilitate the interaction between the processing component 602 and other components. For example, the processing component 602 may include a multimedia module to facilitate the interaction between the multimedia component 608 and the processing component 602.

The memory 604 is configured to store various types of data to support operation at the apparatus 600. Examples of such data include instructions for any application or method operating on the apparatus 600, contact person data, phone book data, messages, pictures, videos, and the like. The memory 604 can be implemented by any type of volatile or non-volatile storage devices or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 606 provides power to various components of the apparatus 600. The power supply component 606 may include a power supply management system, one or more power sources, and other components associated with generating, managing, and distributing power for the apparatus 600.

The multimedia component 608 includes a screen providing an output interface between the above-mentioned apparatus 600 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touches, swipes, and gestures on the touch panel. The above-mentioned touch sensor can not only sense the boundary of a touch action or a sliding action, but also detect the duration and pressure related to the above-mentioned touch operation or sliding operation. In some embodiments, the multimedia component 608 includes a front camera and/or a rear camera. When the apparatus 600 is in an operation mode, such as a shooting mode or a video mode, the front camera and/or the rear camera can receive external multimedia data. Each of the front camera and the rear camera can be a fixed optical lens system or have focal length and optical zoom capabilities.

The audio component 610 is configured to output and/or input audio signals. For example, the audio component 610 includes a microphone (MIC), that is configured to receive an external audio signal when the apparatus 600 is in an operation mode such as a call mode, a recording mode, and a voice recognition mode. The received audio signal may be further stored in the memory 604 or transmitted via the communication component 616. In some embodiments, the audio component 610 further includes a speaker for outputting audio signals.

The I/O interface 612 provides an interface between the processing component 602 and a peripheral interface module. The peripheral interface module mentioned above may be a keyboard, a click wheel, a button, or the like. These buttons may include, but are not limited to: a home button, a volume button, a start button, and a lock button.

The sensor component 614 includes one or more sensors for providing a status assessment of the various aspects to the apparatus 600. For example, the sensor assembly 614 can detect the on/off state of the apparatus 600 and the relative positioning of the components. For example, the components mentioned above are the display and keypad of the apparatus 600. The sensor component 614 can also detect the change in the position of the apparatus 600 or a component of the apparatus 600, the presence or absence of the user's contact with the apparatus 600, the orientation or acceleration/deceleration of the apparatus 600, and the temperature change of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may further include an acceleration sensor, a gyroscope sensor, a magnetic sensor, a pressure sensor, or a temperature sensor.

The communication component 616 is configured to facilitate wired or wireless communication between the apparatus 600 and other devices. The apparatus 600 can access a wireless network based on any communication standard, such as Wi-Fi, 2G, or 3G, or a combination thereof. In one embodiment, the communication component 616 receives a broadcast signal or broadcast-related information from an external broadcast management system via a broadcast channel. In an embodiment, the above-mentioned communication component 616 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the apparatus 600 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, which are used to perform the above method.

In an embodiment, a non-transitory computer-readable storage medium having instructions is also provided, such as a memory 604 including instructions. When the instructions above are executed by the processor 620 of the apparatus 600 to perform the above method. For example, the non-transitory computer-readable storage medium may be a ROM, a random access memory (RAM), a CD-ROM, a magnetic tape, a floppy disk, an optical data storage device, and the like.

The present disclosure provides a non-transitory computer-readable storage medium. When instructions in the storage medium are executed by a processor of a mobile terminal, the mobile terminal can execute a method for detecting an image occluded by a finger. The method includes: obtaining data-to-be-processed through an integrated circuit on a terminal; sending the data-to-be-processed to an application processor of the terminal; and processing, by the application processor, the data-to-be-processed and generating result data.

Figure 7:
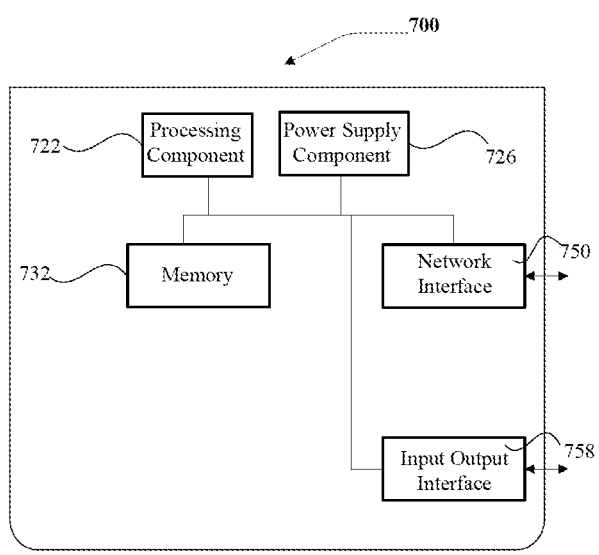
FIG. 7 is a block diagram showing an apparatus according to an exemplary embodiment.

FIG. 7 is a block diagram showing an apparatus 700 for detecting an image occluded by a finger shown according to an exemplary embodiment. For example, the apparatus 700 may be provided as a server. Referring to 7, the apparatus 700 includes a processing component 722, which further includes one or more processors, and a memory resource represented by a memory 732, which are used to store instructions executable by the processing component 722, such as an application program. The application program stored in the memory 732 may include one or more modules, each of these modules corresponds to a set of instructions. In addition, the processing component 722 is configured to execute an instruction to execute the method mentioned above. The method includes obtaining data-to-be-processed through an integrated circuit on a terminal, sending the data-to-be-processed to an application processor of the terminal, and processing, by the application processor, the data-to-be-processed and generating result data.

The apparatus 700 may further include a power supply component 726, configured to perform power supply management of the apparatus 700, a wired or wireless network interface 750, configured to connect the apparatus 700 to a network, and an input/output (I/O) interface 758. The apparatus 700 can operate based on an operating system stored in the memory 732, such as Android, iOS, Windows Server™, Mac OS X™, Unix™, Linux™, FreeBSD™, or the like.

Those skilled in the art will readily contemplate other embodiments of the present disclosure after considering the specification and practicing the invention disclosed herein. This disclosure is intended to cover any variations, uses, or adaptations of this disclosure that follow the general principles of this disclosure and include the common general knowledge or conventional technical means in the technical field not disclosed by this disclosure. It is intended that the specification and examples be considered as exemplary only, with a true scope and spirit of the disclosure being indicated by the following claims.

It should be understood that the present disclosure is not limited to the precise structure that has been described above and illustrated in the accompanying drawings, and various modifications and changes may be made without departing from the scope thereof. The scope of the disclosure is limited only by the following claims.

What is claimed is:

1. A data processing method that is applied to a terminal, the method comprising:

obtaining a data-to-be-processed through an integrated circuit on the terminal, wherein the data-to-be-processed is data that needs to be processed by a software-related firmware;
sending the data-to-be-processed to an application processor of the terminal; and
processing, by the application processor, the data-to-be-processed and generating a result data;
wherein the method further comprises:
setting a hardware-related firmware in the integrated circuit; and
setting a software algorithm library in the application processor.

2. The method according to claim 1, wherein the sending the data-to-be-processed to the application processor of the terminal further comprises:

sending the to-be-processed data to a driving module on the terminal; and
sending, by the driving module, the to-be-processed data to the application processor.

3. The method according to claim 1, further comprising obtaining, by an operating system of the terminal, the result data.

4. The method according to claim 3, wherein obtaining, by the operating system of the terminal, the result data further comprises:

sending, by the application processor, the result data to a driving module on the terminal; and
sending, by the driving module, the result data to an application layer of the operating system.

5. The method according to claim 1, wherein the obtaining the data-to-be-processed through the integrated circuit on the terminal further comprises:

obtaining the data-to-be-processed through the hardware-related firmware in the integrated circuit.

6. The method according to claim 1, wherein the processing, by the application processor, the data-to-be-processed and generating the result data further comprises:

processing, by the application processor via the software-related firmware, the data-to-be-processed, and generating the result data.

7. The method according to claim 1, further comprising:

sending, by an operating system, configuration information of a function switch to the application processor; and
controlling, by the application processor via the software-related firmware, the integrated circuit to perform an operation related to the configuration information of the function switch.

8. A data processing apparatus that is applied to a terminal, the apparatus comprising:

an integrated circuit configured to obtain a data-to-be-processed, wherein the data-to-be-processed is data that needs to be processed by a software-related firmware; and
an application processor configured to receive the data-to-be-processed, process the data-to-be-processed, and generate a result data;
wherein the integrated circuit is configured to include a hardware-related firmware; and
the application processor is configured to include a software algorithm library.

9. The apparatus according to claim 8, the apparatus further comprising a driving module that is configured to:

receive the data-to-be-processed sent by the integrated circuit; and
send the to-be-processed data to the application processor.

10. The apparatus according to claim 8, wherein,
the application processor is further configured to send the result data to a driving module in the apparatus, and
the driving module is further configured to send the result data to an application layer of an operating system.

11. The apparatus according to claim 8, wherein the integrated circuit is further configured to obtain the data-to-be-processed through the hardware-related firmware in the integrated circuit.

12. The apparatus according to claim 8, wherein the application processor is further configured to process, by the application processor via the software-related firmware, the data-to-be-processed and generate the result data.

13. The apparatus according to claim 8, wherein the application processor is further configured to:
   receive configuration information of a function switch sent by an operating system; and
   control the integrated circuit to perform an operation related to the configuration information of the function switch through the software-related firmware.

14. A data processing device that is applied to a terminal, comprising:
   a processor; and
   a memory that is configured to store instructions executable by the processor;
   wherein the processor is configured to:
   obtain a data-to-be-processed through an integrated circuit on the terminal, wherein the data-to-be-processed is data that needs to be processed by a software-related firmware;
   send the data-to-be-processed to an application processor of the terminal; and
   process, by the application processor, the data-to-be-processed and generate a result data;
   wherein the processor is further configured to:
   set a hardware-related firmware in the integrated circuit; and
   set a software algorithm library in the application processor.

15. The data processing device according to claim 14, wherein the processor is further configured to:
   send the to-be-processed data to a driving module on the terminal; and
   send, by the driving module, the to-be-processed data to the application processor.

16. The data processing device according to claim 14, wherein the processor is further configured to:
   obtain, by an operating system of the terminal, the result data.

17. The data processing device according to claim 16, wherein the processor is further configured to:
   send, by the application processor, the result data to a driving module on the terminal; and
   send, by the driving module, the result data to an application layer of the operating system.

* * * * *